United States Patent
Fukami et al.

(10) Patent No.: US 9,273,725 B2
(45) Date of Patent: Mar. 1, 2016

(54) ROLLING BEARING

(75) Inventors: Rino Fukami, Iwata (JP); Shinji Oishi, Iwata (JP); Makoto Nishikawa, Iwata (JP); Tsutomu Nakagawa, Iwata (JP)

(73) Assignee: NTN CORPORATION, Osaka (JP)

( * ) Notice: Subject to any disclaimer, the term of this patent is extended or adjusted under 35 U.S.C. 154(b) by 982 days.

(21) Appl. No.: 13/501,790

(22) PCT Filed: Oct. 14, 2010

(86) PCT No.: PCT/JP2010/068026
§ 371 (c)(1),
(2), (4) Date: Apr. 13, 2012

(87) PCT Pub. No.: WO2011/046164
PCT Pub. Date: Apr. 21, 2011

(65) Prior Publication Data
US 2012/0207422 A1    Aug. 16, 2012

(30) Foreign Application Priority Data
Oct. 16, 2009   (JP) .................................. 2009-239376

(51) Int. Cl.
*F16C 33/46* (2006.01)
*F16C 33/50* (2006.01)
(Continued)

(52) U.S. Cl.
CPC ............... *F16C 33/504* (2013.01); *F16C 33/56* (2013.01); *F16C 43/04* (2013.01); *F16C 2206/40* (2013.01); *F16C 2208/00* (2013.01)

(58) Field of Classification Search
CPC ............. F16C 33/4611; F16C 33/4641; F16C 33/4647; F16C 33/4652; F16C 33/4658; F16C 33/4664; F16C 33/502; F16C 33/504; F16C 33/3831; F16C 33/3862; F16C 33/3868; F16C 33/3875; F16C 33/3881; F16C 43/04
USPC .......... 384/577, 578, 579, 523, 528, 572, 573
See application file for complete search history.

(56) References Cited

U.S. PATENT DOCUMENTS 519,868 A * 5/1894 Mossberg ...................... 384/579
543,262 A * 7/1895 Mossberg ...................... 384/579
(Continued)

FOREIGN PATENT DOCUMENTS

CN          2753919 Y     1/2006
CN        101137854 A     3/2008
(Continued)

OTHER PUBLICATIONS

Machine translation of JP2009-191990, generated by JPO online machine translation service on Mar. 31, 3015.*
(Continued)

*Primary Examiner* — James Pilkington

(57) ABSTRACT

A rolling contact bearing assembly includes a cage including two or more arcuate members each having a plurality of pockets defined therein for accommodating a corresponding number of rollers arranged consecutively in a circumferential direction to form a ring shaped assembly. The arcuate members are connected together by a retention ring, having an elasticity, over a circumference of the cage. The arcuate members are displaced radially outwardly against an elastic compressive force of the retention ring such that circumferential gaps are formed at joints between the neighboring arcuate members. The arcuate members are held in a condition movable in the circumferential direction by a distance equal to the size of the circumferential gaps.

7 Claims, 7 Drawing Sheets

(51) Int. Cl.
*F16C 43/04* (2006.01)
*F16C 33/56* (2006.01)

(56) References Cited

U.S. PATENT DOCUMENTS

| | | | |
|---|---|---|---|
| 868,105 | A | 10/1907 | Lockwood |
| 1,125,316 | A | 1/1915 | Heinzelman |
| 1,530,453 | A * | 3/1925 | Wilson .......................... 384/578 |
| 2,010,108 | A * | 8/1935 | Riblet .......................... 384/579 |
| 5,184,899 | A | 2/1993 | Harimoto |
| 7,896,557 | B2 | 3/2011 | Nakano et al. |
| 2008/0181549 | A1 | 7/2008 | Nakano et al. |
| 2009/0028482 | A1 | 1/2009 | Iwata et al. |

FOREIGN PATENT DOCUMENTS

| | | |
|---|---|---|
| DE | 10302002 | 7/2004 |
| FR | 2675554 | 10/1992 |
| JP | 5-19652 | 3/1993 |
| JP | 5-89952 | 12/1993 |
| JP | 7-127645 | 5/1995 |
| JP | 2009-30666 | 2/2009 |
| JP | 2009-85401 | 4/2009 |
| JP | 2009-191990 | 8/2009 |

OTHER PUBLICATIONS

Machine translation of JP2009-030666, generated by JPO online machine translation service on Mar. 31, 3015.*
Japanese Office Action mailed Mar. 12, 2013 for corresponding Japanese Application No. 2009-239376.
International Preliminary Report on Patentability mailed May 24, 2012 issued in corresponding International Patent Application No. PCT/JP2010/068026.
Chinese Office Action dated May 8, 2014 in corresponding Chinese Patent Application No. 201080046557.9.
Extended European Search Report dated Apr. 11, 2014 in corresponding European Patent Application No. 10823432.9.
International Search Report for PCT/JP2010/068026 mailed Jan. 11, 2011.
Chinese Office Action issued Nov. 5, 2013 in corresponding Chinese Patent Application No. 201080046557.9

* cited by examiner

ROLLING BEARING

CROSS REFERENCE TO RELATED APPLICATIONS

This application claims the benefit under 35 U.S.C. Section 371, of PCT International Application No. PCT/JP2010/068026, filed Oct. 14, 2010, which claimed priority to Japanese Application No. 2009-239376, filed Oct. 16, 2009 in the Japanese Patent Office, the disclosures of which are hereby incorporated by reference.

BACKGROUND OF THE INVENTION

1. Field of the Invention

The present invention relates to a rolling contact bearing assembly utilizing a plurality of rollers and a cage, or a roller bearing, and, more particularly, to an improvement of the cage designed to avoid the occurrence of fretting and generation of obnoxious noises during the operation of the roller bearing.

2. Description of Related Art

It is well known in the art that a cage equipped needle roller bearing is currently largely employed not only in automotive vehicles, but also in various industrial machines and equipments because it has light weight and compact features. For example, a transmission for use in an automotive vehicle makes use of the cage equipped needle roller bearing as an idler bearing. The cage equipped needle roller bearing is currently available in two types, one piece type and split type, and the split type is generally considered desirable particularly where prevention of fretting in bearing is of a prime concern.

More specifically, in the idler bearing of the kind referred to above, when speed change gears are engaged with each other, the speed change gear rotates together with a shaft and therefore, a relative rotation of the bearing becomes zero. For this reason, each of rollers tends to be loaded with a load always at the same circumferential position as an inner diametric surface of the gear and an outer diametric surface of the shaft, both of which define a raceway surface, accompanied by a faint quivering, which eventually leads to a wear. This wear in turn leads to formation of wavy dents at a pitch equal to the pitch of the rollers over the entire periphery of the raceway surface, accompanied by generation of a fretting wear.

If a cage is employed in the form of the split type cage, a relative rotation occurs in cage halves in a non-loaded condition in the presence of a circumferential gap left by the split, and as a result, the fretting can be prevented.

However, regarding the bearing of the type in which the cage is of the split type as hereinabove discussed, the two cage halves are required to be assembled separately even though they can be assembled in an axial direction. In addition, after the cage has been assembled on the shaft during the assembling work, there is the inconvenience that at the time of assemblage of, for example, the speed change gears, the cage may fall unless it is manually retained or fixed by a jig, and, hence, the work efficiency is worse. Also, the two cage halves are separate from each other, the number of component part is indeed many and, therefore, there is a problem in respect of storage and transportation.

In an attempt to alleviate the foregoing problems and inconveniences, the following suggestions have been made in the art concerned.

(1) The cage is split into a pair of cage halves, which are in turn bonded together by means of a bonding agent applied to circumferential ends of those cage halves, so that the bonding agent can be fused by the temperature then increasing as a result of the operation. In this respect, see the patent document 1 listed below.

(2) The cage is split into a pair of cage halves, which are in turn temporarily connected together by means of a temporary joint member applied to circumferential ends of those cage halves. Material used for the temporary joint member has an affinity to a lubricant oil and is rendered to be a soluble resin. In this respect, see the patent document 2 listed below.

(3) The cage is split into, for example, a pair of cage halves, which are in turn temporarily connected with each other at respective ends of the cage halves by means of a weld, so that temporarily connected portions may be destructed by stresses during the operation. In this respect, see the patent document 3 listed below.

(4) The case is split into, for example, a pair of cage halves, which are in turn connected together in a fashion displaced axially relatively, so that during the assemblage a pressing force is applied to remove the axial displacement thereof. In this respect, see the patent document 4 listed below.

PRIOR ART LITERATURE

[Patent Document 1] JP Laid-open Utility Model Publication No. 05-19652

[Patent Document 2] JP Laid-open Utility Model Publication No. 05-89952

[Patent Document 3] JP Laid-open Patent Publication No. 07-127645

[Patent Document 4] JP Laid-open Patent Publication No. 2009-85401

It has, however, been found that considering that the technique disclosed in each of the patent documents 1 and 2 listed above is such that the cage is split by the temperature and/or the lubricant oil during the operation, the cage will not be split particularly where the operating temperature, for example, is low and/or the lubricant oil is not sufficiently supplied. Also, where the cage is split into two components by destruction or respective axial positions of the two cage halves are aligned by pressing such as disclosed in each of the patent documents 3 and 4 listed above, debris will occur as a result of the destruction or pressing, which debris are in turn captured into, for example, the bearing, and due to this, abnormal vibration and/or bearing breakage and, yet, malfunctioning of a transmission will result in.

SUMMARY OF THE INVENTION

An object of the present invention is to provide a rolling contact bearing assembly of a type inexpensive and easy to assemble and effective to function assuredly as a split type without relying on the operating state to thereby avoid the fretting phenomenon.

The rolling contact bearing assembly designed in accordance with the present invention is of a type, in which a cage includes two or more arcuate members each having a plurality of pockets defined therein for accommodating a corresponding number of rollers are placed one above the other to form a ring shaped assembly so as to continue with each other in a circumferential direction of the ring shaped assembly, the arcuate members being non-separably connected together by means of a retention ring over the entire circumference of the cage.

According to the construction described above, at the time of mounting of the cage on the transmission, the two or more arcuate members can be handles as a signal unitary component in which they are connected together in a ring form by the retention ring. For this reason, there is no need to assemble a gear while the cage is manually retained for fear of being fallen down and, therefore, the workability is considerably increased. Also, there is no need to fit the gear immediately after the mounting of the cage, and, therefore, the degree of freedom of work procedures increases.

In a condition in which the cage has been assembled onto a shaft, the respective arcuate members, even though no circumferential gap is formed at the joints between the respective arcuate members, move in a direction away from each other by the effect of the centrifugal force when rotated, and as a result, the circumferential gaps result in. For this reason, the respective arcuate members are held in a condition movable in the circumferential direction at any time over a distance equal to the size of the circumferential gaps. Accordingly, where the shaft and the gear rotate together while a load is loaded on the cage equipped roller bearing assembly utilizing the cage of the structure hereinbefore described, the rotation is retarded because a driving force is lost from the arcuate members in a non-loaded region. Also, when the arcuate members shift into a loaded region, the radial gap changes from positive to zero and, therefore, the rollers accommodated within the corresponding pockets in the arcuate members will be braked, resulting in retardation of the rotation. In other words, a relative rotation of the arcuate members relative to the shaft and the gear occurs. For this reason, the occurrence of the fretting can be avoided. In view of the above, assemblage is easy to accomplish and requires a reduced cost, and further, the cage can function as the split type assuredly without relying on the operating condition, thereby avoiding the fretting.

In the present invention, in a condition having not yet been assembled onto a shaft, respective side edges of one of the arcuate members, which have been connected together by means of the retention ring, may be held in contact with mating side edges of the other of the arcuate members, but in a condition having been assembled onto the shaft, the arcuate members may displaced radially outwardly against an elastic compressive force of the retention ring to invite circumferential gaps at joints between the neighboring arcuate members. It is to be noted that in the condition having been mounted on the shaft, since the rollers accommodated within the corresponding pockets are held in contact with the shaft with the roller pitch controlled by the pockets, the arcuate members are displaced radially outwardly.

In the present invention, the retention ring for the cage may be formed by bending a wire member to a shape similar to the shape of a figure "C". According to formation of the retention ring by bending the wire member to the C-shape, it is possible to manufacture the retention ring inexpensively and the arcuate members can be easily rotated along the retention ring during the operation of the bearing assembly.

In the present invention, the retention ring of the C-shaped configuration for the cage preferably has a split defined therein and is arranged so as to assume a position circumferentially offset from the joint between the arcuate members. By so doing, a force to integrate the cage for the roller bearing assembly can be strengthened, and as a result, it is possible to avoid an undesirable displacement of the arcuate members in the axial direction relative to each other.

In the present invention, each of the arcuate members forming respective parts of the cage may include a pair of axially spaced arcuate end areas and a number of pillars arranged in a row in a direction circumferentially of the cage and partitioning the neighboring pockets from each other, each of the pillars extending between the axially spaced arcuate end areas, wherein each of the arcuate end areas has an outer arc surface formed with a groove extending circumferentially, and the retention ring is engaged in the groove.

In the present invention, the retention ring for the cage is preferably engaged completely within the groove to avoid protrusion thereof outwardly from an outer peripheral surface of the arcuate members joined in the ring form. If the retention ring engaged in the respective groove in the arcuate members is avoided from protruding outwardly from the outer peripheral surface of the ring shaped assembly of the arcuate members, the retention ring will not interfere with any other member during assemblage onto the gear and, therefore, the assemblage can be easily accomplished.

In the present invention, the grooves may be defined respectively in outer arc surfaces of the two arcuate end areas of the arcuate members, a pair of the retention rings, formed by bending a respective wire member to a shape similar to the shape of a figure "C", are engaged in the grooves with respective slits of those retention rings offset from each other in the circumferential direction. By so doing, even when the arcuate members undergo a relative rotation with splits thereof matched with a joint of one of the retention rings, the split of the other of the retention rings assumes a circumferential position displaced from the joint of the arcuate member. As a result thereof, during the relative rotation of the arcuate members, the arcuate members are smoothly guided by the retention ring. In other words, although there is the risk that in the event that the splits of the retention rings assume the same position when viewed in a widthwise direction and overlap with the joint of the arcuate member, the arcuate members displace in the axial direction and end faces of the retention ring may be caught with end faces of the arcuate members, resulting in failure of the relative rotation of the cage, this risk can be eliminated if the splits of the retention rings are displaced as described above.

In the present invention, each of the arcuate members forming respective parts of the cage may be formed by bending a plate member. This makes it possible to manufacture the arcuate members inexpensively.

In the present invention, the arcuate members forming respective parts of the cage may have respective shapes that are identical with each other. This makes it possible to manufacture the cage for the roller bearing assembly inexpensively.

The rolling contact bearing assembly of the present invention may be the one, which will become an idler bearing in a transmission.

The cage for the roller bearing assembly according to the present invention may include two or more arcuate members each having a plurality of pockets defined therein for accommodating a corresponding number of rollers, and a retention ring for non-separably connecting together the arcuate members juxtaposed in a ring form in a circumferential direction over the entire circumference of the cage. According to the construction described above, assemblage is easy to accomplish and requires a reduced cost, and the cage can function as the split type assuredly without relying on the operating condition, thereby avoiding the fretting.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

One preferred embodiment of the present invention will now be described in detail with particular reference to FIGS. 1 to 11. A retainer or cage 1 employed in a rolling contact bearing assembly is of a type comprised of two first and second arcuate members 2A and 2B connected together so as to assume a ring shaped configuration. More specifically, each of the first and second arcuate members 2A and 2B has a curved or convexed outer surface, or an outer arc surface, and a curved or concaved inner surface, or an inner arc surface opposite to the outer arc surface, and also has first and second side edges opposite to each other. The first and second arcuate members 2A and 2B so shaped as described above have respective groups of roller pockets 3 defined therein for accommodating a corresponding number of rollers and are positioned one above the other so as to assume the ring shaped configuration with the first and second opposite side edges of one of the first and second arcuate members 2A and 2B held in engagement with the first and second opposite side edges of the other of the first and second arcuate members 2A and 2B, respectively. The first and second arcuate members 2A and 2B so positioned are non-separably connected together with each other by means of retention rings 4, as will be detailed later, to render a ring shaped assembly of the first and second arcuate members 2A and 2B to complete the cage 1.

In the instance as shown and described above, reference has been made to the use of the two first and second arcuate members 2A and 2B, which are connected together by means of the retention rings 4, but the number of the arcuate members used in the practice of the present invention may not be necessarily limited to two such as shown and described and may be more than two.

Figure 2A:
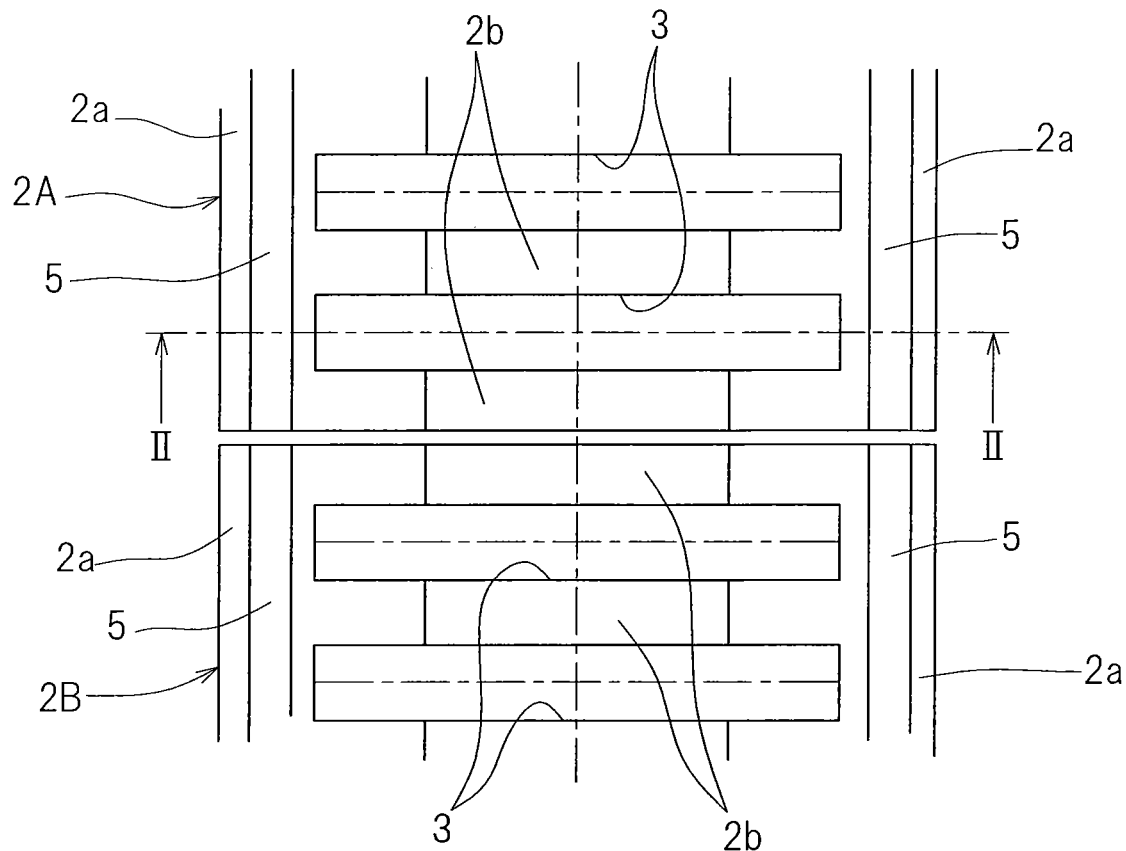
FIG. 2A is a fragmentary enlarged side view showing the cage for the roller bearing assembly.
Figure 2B:
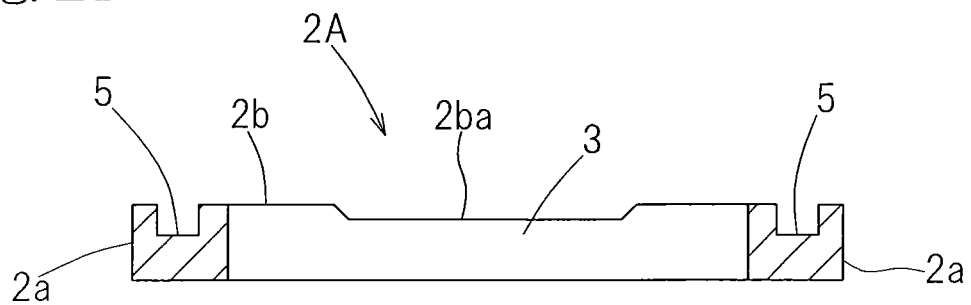
FIG. 2B is a cross sectional view taken along the line II-II in FIG. 2A.
Figure 3:
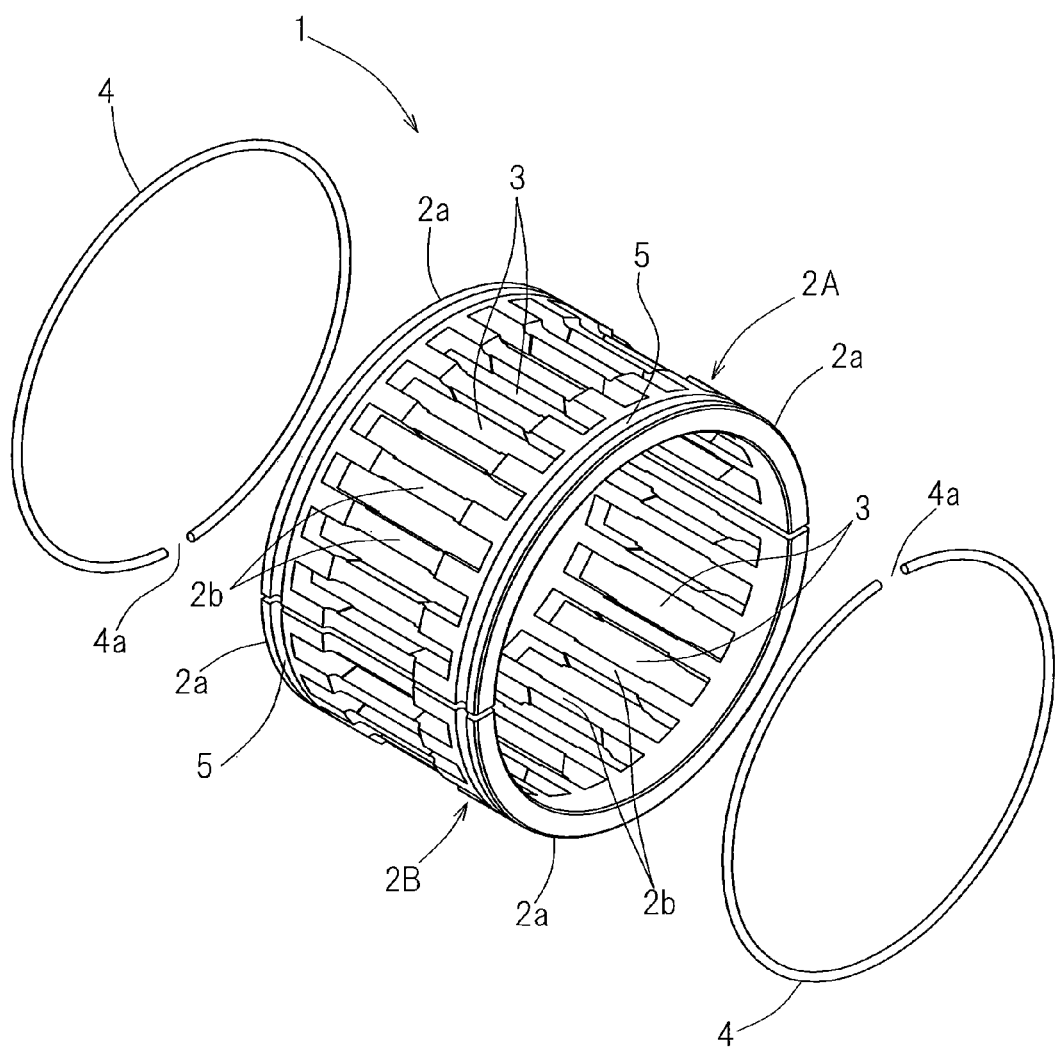
FIG. 3 is an exploded perspective view of the cage.

Referring to FIGS. 2A and 2B, each of the first and second arcuate members 2A and 2B has first and second arcuate end areas 2a, each lying perpendicular to any of the first and second side edges thereof or the length of each of the pockets 3, and pillars 2b each connecting between the first and second arcuate end areas 2a and positioned between the neighboring pockets 3.

With each of the arcuate member 2A or 2B so designed and so configured as described above, the outer arc surface of each of the first and second arcuate members 2A and 2B is, in the presence of each pocket 3 between the neighboring pillars 2b, segmented into outer surface segments, two on each side of the pocket 3, each of which surface segments forms an outer surface of the respective pillar 2b. As best shown in FIG. 2B, the outer surface of each pillar 2b has a portion intermediate of the length thereof, which is so depressed generally radially inwardly as at 2ba that the intermediate portion of each pillar 2b can have a thickness reduced as compared with that of the remaining portions of the respective pillar 2 adjacent the first and second arcuate end areas 2a and 2a. It is, however, to be noted that the sectional shape of the depressed region 2ba shown in FIG. 2B is only for the purpose of illustration and may represent any suitable sectional shape such as, for example, a V-shape or an M-shape.

Each of the pillars 2b has opposite side faces, both being left in each first and second arcuate member 2A and 2B when the neighboring pockets 3 are formed in the manner described above, and the opposite side faces of each pillar 2b confronting the associated pocket 3 has such a sectional shape, when viewed in a direction parallel to the lengthwise direction of such pillar 2b, as to prevent the corresponding roller from separating out of the associated pocket 3 in either two directions radially outwardly and inwardly, respectively, or in only one direction radially outwardly or inwardly while permitting the cage 1 to be guided by the rollers. Alternatively, the opposite side faces of each pillar 2b confronting the associated pocket 3 may have such a sectional shape as to be incapable of preventing the roller from separating out of the associated pocket 3.

Also, the cage 1 may be either an outer ring guiding type, in which the outer diametric surface thereof is guided in contact with an outer ring, or a rolling element guiding type in which the cage is guided by the rollers. The pitch between the neighboring pockets 3 may be either constant or an irregular pitch.

Each of the first and second arcuate members 2A and 2B is formed with a pair of axially spaced grooves 5 defined radially inwardly in the outer arc surfaces of the first and second arcuate end areas 2a, respectively, so as to extend in a direction following the curvature of the associated arcuate member 2A and 2B or in a direction circumferentially of the cage 1. The grooves 5 in the first arcuate member 2A are, when the first and second arcuate members 2A and 2B are placed one above the other to substantially form the cage 1, aligned with the grooves 5 in the second arcuate member 2B to complete the grooves 5 for receiving the corresponding retention rings 4 extending over the substantially entire circumference of the cage 1 in a manner as will be detailed subsequently.

After the first and second arcuate members 2A and 2B have been joined together to complete the cage 1, the retention rings 4 are mounted onto the cage 1 so as to be received completely within the associated grooves 5. Each of the retention rings 4 must have such a sectional area that when it is engaged in the corresponding groove 5, it will not protrude radially outwardly from the outer arc surface of the first and second arcuate end areas 2a, that is, the outer curved surface of the cage 1.

Figure 4:
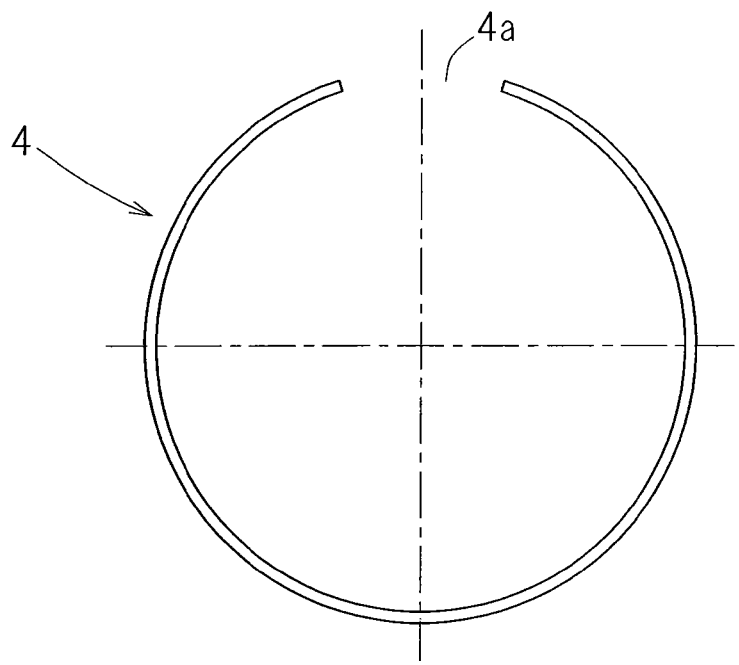
FIG. 4 is a front elevational view showing a retention ring used in the cage.

Each of the retention rings 4 referred to above is formed by bending a wire member to assume a shape generally similar to the shape of a figure "C" as best shown in FIG. 4 in a front elevational view. For the wire member used to form the respective retention ring 4, a wire rod having an elasticity and also having a round sectional shape, such as, for example, a steel wire can be employed. Hence, each of the retention rings 4 may be considered a circlip or C-clip.

In a natural, unstressed condition, in which the retention ring 4 has not yet been mounted onto the ring shaped assembly, composed of the first and second arcuate members 2A and 2B, to complete the cage 1 and, hence, the retention ring 4 has not yet been stressed, the elastic retention ring 4 has a split 4a at any point on the circumference of the ring so as to define opposite ends of the elastic retention ring 4. In the practice of the present invention, the split 4a referred to above may be either opened, in which the opposite ends of the ring are spaced a certain distance from each other during the natural, unstressed condition of the respective elastic retention ring 4, or closed in which the opposite ends of the ring are in contact with each other during the natural, unstressed condition thereof.

Each of the first and second arcuate members 2A and 2B is prepared from a metallic plate such as, for example, a steel plate by the use of any known bending technique. Accordingly, it is possible to manufacture the first and second arcuate members 2A and 2B inexpensively. In the embodiment now under discussion, the first and second arcuate members 2A and 2B are identical in shape with each other. Accordingly, it is possible to manufacture the cage 1 for use in a bearing assembly inexpensively. It is eventually to be noted that each of the first and second arcuate members 2A and 2B may be made of, for example, a resinous material or ceramics.

The elastic retention rings 4 of the type discussed above, when being mounted onto the cage 1, are elastically engaged in the respective first and second grooves 5 so that the splits 4a in the elastic retention rings 4 can assume positions offset from the joint between the first side edge of the first arcuate member 2A and the second side edge of the second arcuate member 2B and the joint between the second side edge of the first arcuate member 2A and the first side edge of the second arcuate member 2B, respectively, in a direction circumferentially of the cage 1. Thus, a holding force to hold the first and second arcuate members 2A and 2B together can be enhanced thereby to avoid an undesirable displacement of the first and second arcuate members 2A and 2B in the axial direction relative to each other. Also, the respective splits 4a in the two elastic retention rings 4, when and after the latter have been engaged in the first and second grooves 5 as described above, are preferably offset a certain angular distance relative to each other in the circumferential direction of the cage 1.

Figure 1:
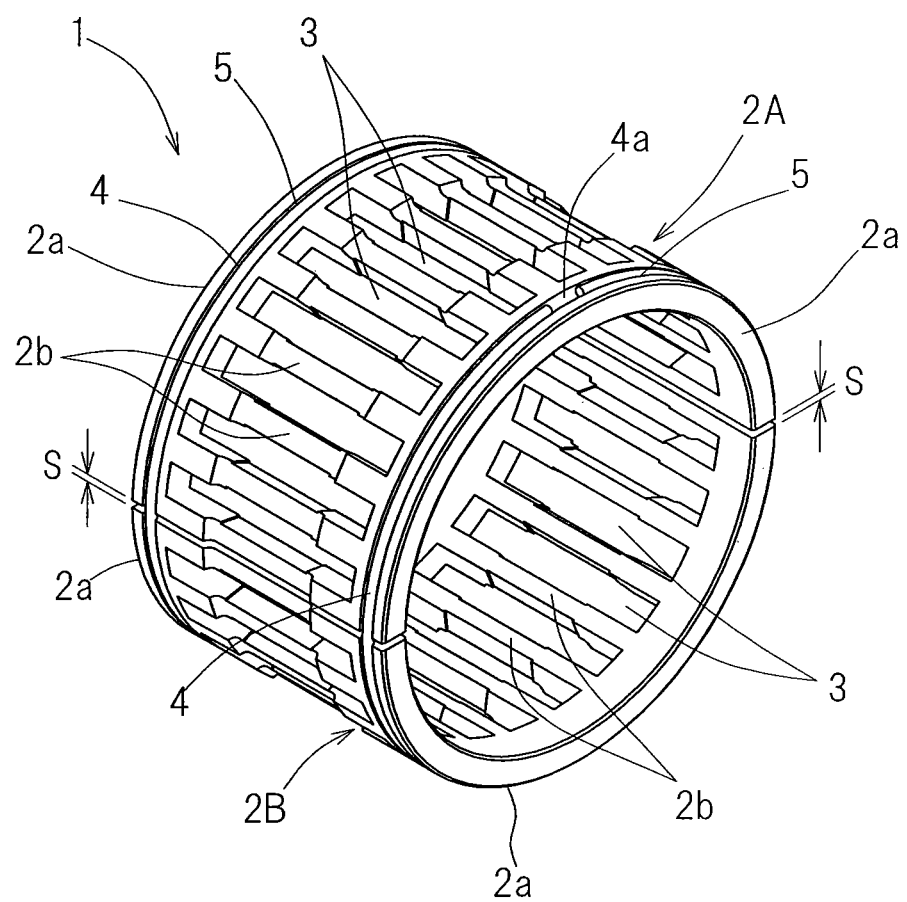
FIG. 1 is a perspective view showing a cage forming a part of a roller bearing assembly designed in accordance with a first preferred embodiment of the present invention.
Figure 5:
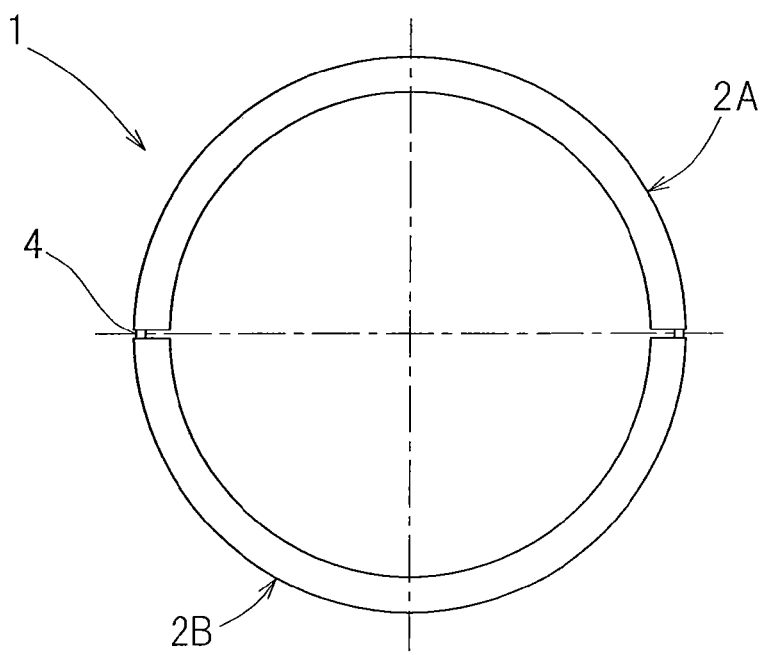
FIG. 5 is a front elevational view of the cage.
Figure 6:
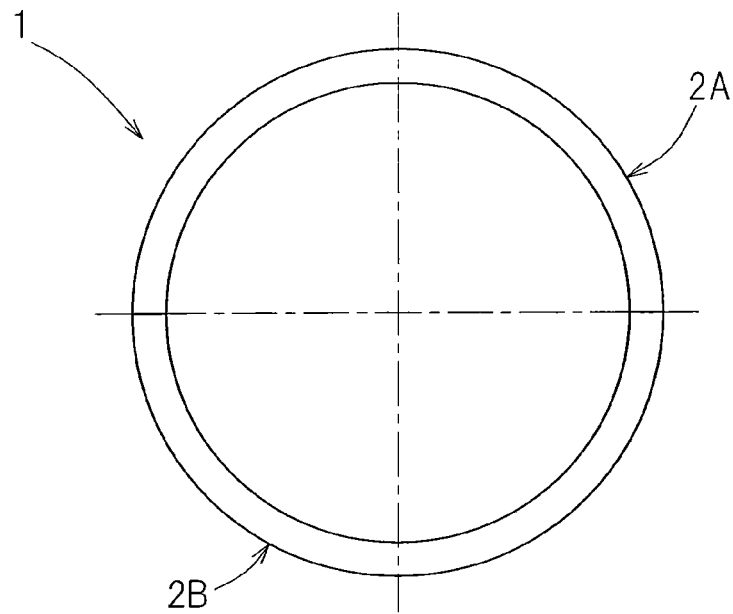
FIG. 6 is a front elevational view showing a different example of structure of the cage.

Although so far shown in FIGS. 1 and 5, respective circumferential gaps S are shown as formed in the respective joints between the first and second side edges of the first arcuate member 2A and the second and first side edges of the second arcuate member 2B, those circumferential gaps S are so formed when the cage 1 for the roller bearing assembly is assembled on a shaft (not shown). In practice, however, before the cage 1 is assembled onto the shaft, the first and second arcuate members 2A and 2B are radially inwardly urged by the effect of elastic compressive forces exerted by the corresponding elastic retention rings 4, each forming the circlip. Specifically, prior to the mounting of the cage 1 onto the shaft, the first and second arcuate members 2A and 2B are urged radially inwardly by the elastic retention rings 4 to such an extent that the ring shaped assembly of the first and second arcuate members 2A and 2B may be undersized relative to the outer diameter of the shaft as if the circle depicted by the respective concaved inner surfaces of the first and second arcuate members 2A and 2B so connected together were to assume a position radially inwardly of the outer diameter of the shaft (i.e., were to assume a diameter smaller than the outer diameter of the shaft). In this assembled condition of the first and second arcuate members 2A and 2B, that is, the cage 1 before being mounted on the shaft, no circumferential gap S may be substantially present in between the first and second side edges of the first arcuate member 2A and the second and first side edges of the second arcuate member 2B as shown in FIG. 6.

Figure 7:
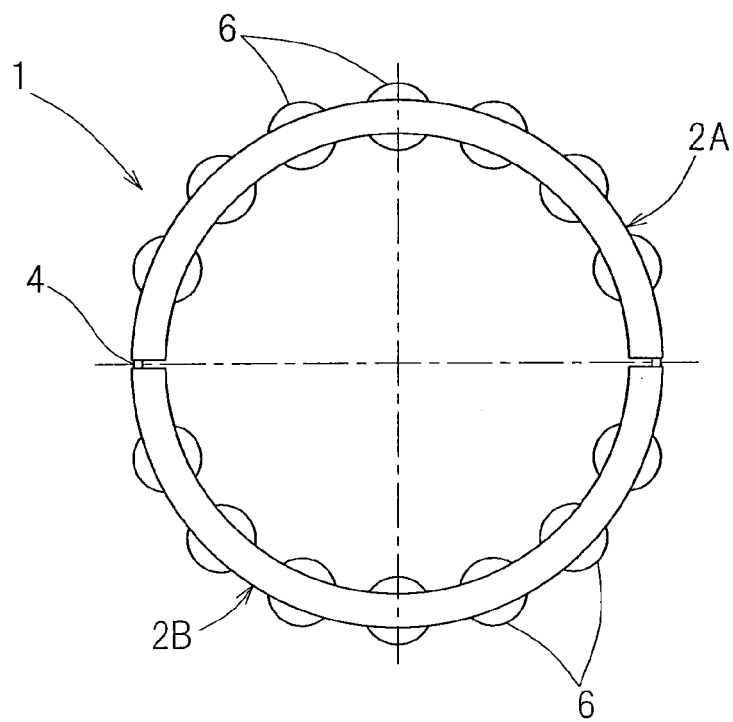
FIG. 7 is a front elevational view showing the roller bearing assembly in a condition having incorporated rollers in the cage.
Figure 8:
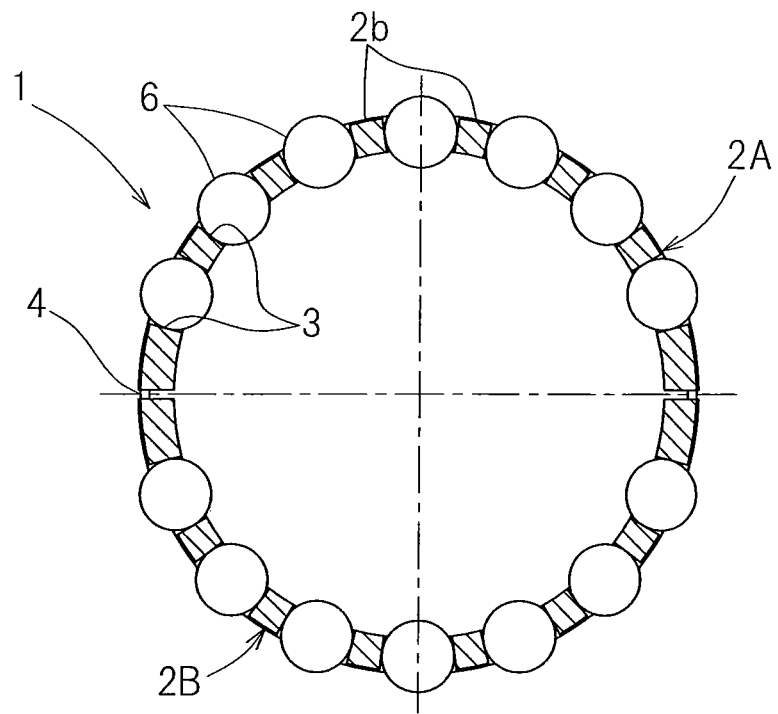
FIG. 8 is a front sectional view showing the roller bearing assembly in the condition having incorporated the rollers in the cage.
Figure 9:
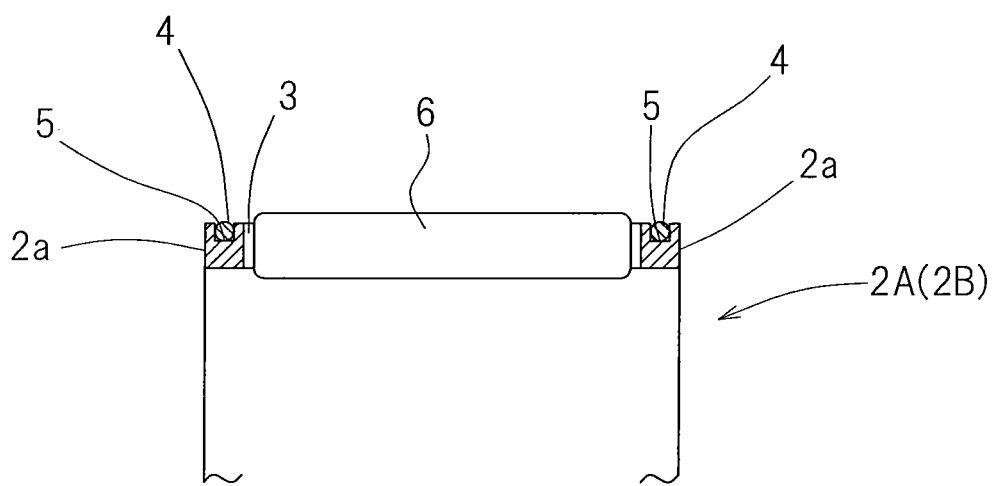
FIG. 9 is a fragmentary sectioned side view showing the roller bearing assembly in the condition having incorporated the rollers in the cage.

The above no gap and gap statuses are equally applied to FIGS. 7 and 8. FIG. 7 illustrates a front elevational view showing the roller bearing assembly in a condition having incorporated the rollers in the pockets 3 defined in the cage 1, FIG. 8 illustrates a front sectional view thereof and FIG. 9 illustrates a fragmentary sectioned side view thereof. It is to be noted that the presence of the circumferential gaps S between the first and second side edges of the first arcuate member 2A and the second and first side edges of the second arcuate member 2B may not be essentially required when the cage 1 for the roller bearing assembly is mounted onto the shaft. When rotated, the first and second arcuate members 2A and 2B tend to move in a direction away from each other by the effect of a centrifugal force, accompanied by formation of the circumferential gaps S.

Figure 10:
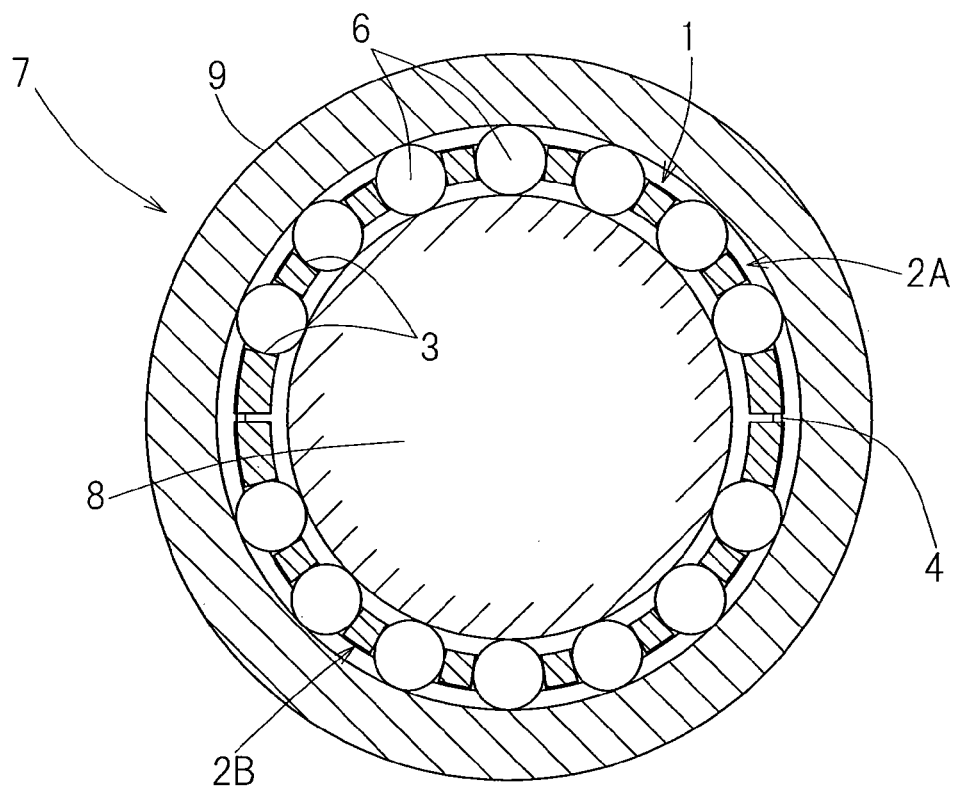
FIG. 10 is a front sectional view showing the roller bearing assembly utilizing the cage.
Figure 11:
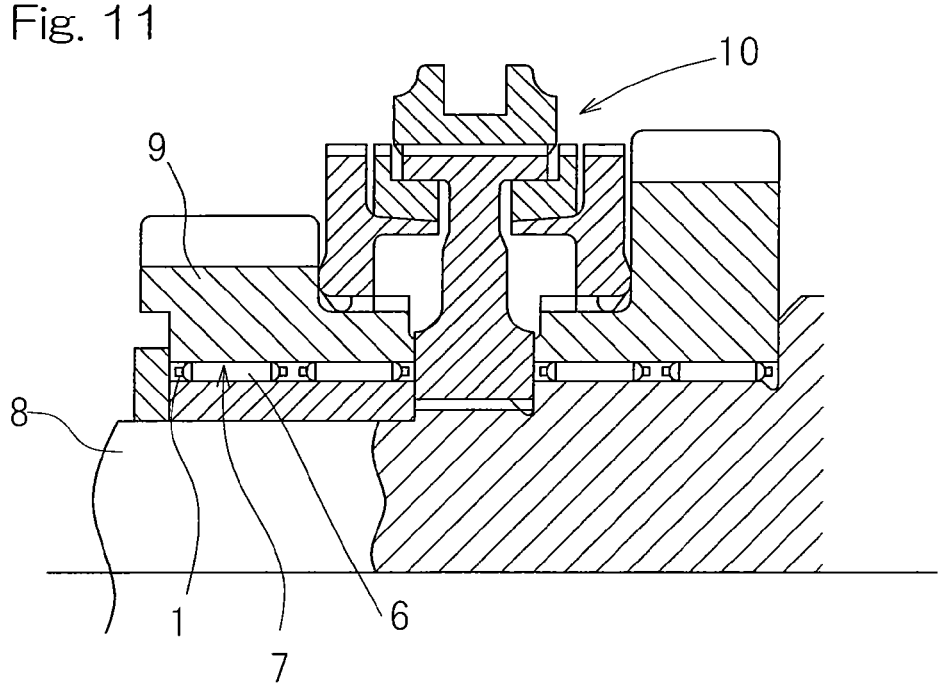
FIG. 11 is a sectional view showing a part of a transmission for an automotive vehicle, in which the cage equipped roller bearing assembly is used as an idler bearing.

FIG. 10 illustrates a front sectional view showing the cage equipped roller bearing assembly 7, which is a rolling contact bearing assembly utilizing the cage 1 of the structure hereinabove described, and FIG. 11 illustrates a sectional view showing a synchro mechanism 10, which is one of transmissions for use in automotive vehicle that utilize the cage equipped roller bearing assembly 7 as an idler bearing. The cage equipped roller bearing assembly 7 shown in FIGS. 10 and 11 is of a type, in which the cage 1 having the rollers 6 is disposed between a rotary shaft 8, which will be an inner ring, and an outer ring 9. In the transmission shown in FIG. 11, the outer ring 9 referred to above is constituted by an idler gear.

According to the cage equipped roller bearing assembly 7 of the structure hereinbefore fully described, at the time of mounting of it on the transmission, it can be handled as a signal unitary component in which the two or more arcuate members 2A and 2B are connected together in a ring form by the retention rings 4. For this reason, there is no need to assemble the outer ring (gear) 9 while the cage 1 is manually retained for fear of being fallen down and, therefore, the workability is considerably increased. Also, there is no need to fit the outer ring (gear) 9 immediately after the mounting of the cage 1, and, therefore, the degree of freedom of work procedures increases.

Moreover, since in the embodiment shown and described, the retention rings 4 engaged completely within the corresponding grooves 5 without protruding radially outwardly from that outer peripheral surface of the ring shaped assembly, which surface is defined by outer arc surfaces of the first and second arcuate end areas 2a in the first and second arcuate members 2A and 2B, the retention rings 4 will not interfere with component parts around them during the assemblage onto the outer ring (gear) 9, thus facilitating the assemblage.

As hereinbefore described, in a condition in which the cage 1 has been assembled onto the rotary shaft 8 which will be the inner ring, the first and second arcuate members 2A and 2B displace radially outwardly against the elastic compressive forces of the retention rings 4, resulting in formation of the circumferential gaps S at the joints between the first and second arcuate members 2A and 2B. Also, since in the condition in which the cage 1 has been assembled onto the rotary shaft 8, the first and second arcuate members 2A and 2B, even though no circumferential gap S is formed at the joints between the first and second arcuate members 2A and 2B, move in a direction away from each other by the effect of the centrifugal force when rotated, the circumferential gaps S result in. For this reason, the first and second arcuate members 2A and 2B are held in a condition movable in the circumferential direction at any time over a distance equal to the size of one or both of the circumferential gaps S.

Accordingly, where the rotary shaft 8 and the outer ring (gear) 9 rotate together while a load is loaded on the cage equipped roller bearing assembly 7 utilizing the cage 1 of the structure hereinbefore described, the rotation is retarded because a driving force is lost from the arcuate members in a non-loaded condition. Also, when the arcuate members shift into a loaded region, the radial gap changes from positive to zero and, therefore, the rollers accommodated within the corresponding pockets in the arcuate members will be braked, resulting in retardation of the rotation. In other words, a relative rotation of the arcuate members relative to the rotary shaft 8 and the outer ring 9 occurs. For this reason, the occurrence of the fretting can be avoided. Also, since in the embodiment hereinbefore fully described, the wire material is used to form each of the retention rings 4 by means of any known bending technique, the arcuate members 2A and 2B can readily take place relative rotation along the retention rings 4.

Yet, since in the embodiment hereinbefore fully described, the retention rings 4, which are engaged in the respective grooves 5 defined in the outer arc surfaces of the first and second arcuate end areas 2a, respectively, of the first and second arcuate members 2A and 2B, are so disposed as to permit the respective splits 4a to be offset relative to each other in the circumferential direction, even when the splits 4a of one of the retention rings 4 are aligned with the joint between the first and second arcuate members 2A and 2B as a result of the relative rotation of the first and second arcuate members 2A and 2B, the split 4a of the other of the retention rings 4 assumes a circumferential position displaced from the joint between the first and second arcuate members 2A and 2B. Accordingly, at the time of the relative rotation of the arcuate members 2A and 2B, the arcuate members 2A and 2B are smoothly guided by the retention rings 4.

In contrast thereto, where the splits 4a of the respective retention rings 4 assume the same circumferential position with each other and are aligned with the joints between the first and second arcuate members 2A and 2B when the latter are joined together, the arcuate members 2A and 2B displace axially and, therefore, there is the risk that end faces of one or both of the retention rings 4 may be caught by associated side edge of the arcuate members 2A and 2B, failing the arcuate members 2A and 2B to undergo the relative rotation.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Cage for roller bearing assembly
2A, 2B . . . Arcuate member
2a . . . Arcuate end area
2b . . . Pillar
3 . . . Pocket
4 . . . Retention ring
4a . . . Split
5 . . . Groove
6 . . . Roller
7 . . . Cage equipped roller bearing assembly (Rolling contact bearing assembly)
8 . . . Shaft
9 . . . Outer ring (Gear)

What is claimed is:

1. A rolling contact bearing assembly comprising:
   a cage including two or more arcuate members each having a plurality of pockets defined therein for accommodating a corresponding number of rollers arranged consecutively in a circumferential direction to form a ring shaped assembly,
   in which the arcuate members are connected together by a retention ring, having an elasticity, over a circumference of the cage,
   in which the arcuate members are displaced radially outwardly against an elastic compressive force of the retention ring such that circumferential gaps are formed at joints between the neighboring arcuate members, and
   in which the arcuate members are held in a condition movable in the circumferential direction by a distance equal to the size of the circumferential gaps.

2. The rolling contact bearing assembly as claimed in claim 1, in which each of the arcuate members forming respective parts of the cage comprises a pair of axially spaced arcuate end areas and a number of pillars arranged in a row in a direction circumferentially of the cage and partitioning the neighboring pockets from each other, each of the pillars extending between the axially spaced arcuate end areas,
   wherein each of the arcuate end areas has an outer arc surface formed with a groove extending circumferentially, and
   wherein the retention ring comprises a first C-shaped retention ring and a second C-shaped retention rings, the first C-shaped retention ring and the second C-shaped retention ring being engaged in the respective grooves.

3. The rolling contact bearing assembly as claimed in claim 2, in which the first C-shaped retention ring and the second C-shaped retention ring for the cage are engaged completely within the grooves to avoid protrusion thereof outwardly from an outer peripheral surface of the arcuate members joined in the ring form.

4. The rolling contact bearing assembly as claimed in claim 2, in which the first C-shaped retention ring and the second C-shaped retention ring are engaged in the respective grooves with respective slits of the first C-shaped retention ring and the second C-shaped retention ring offset from each other in the circumferential direction.

5. The rolling contact bearing assembly as claimed in claim 1, in which each of the arcuate members forming respective parts of the cage is formed by bending a plate member.

6. The rolling contact bearing assembly as claimed in claim 1, in which the arcuate members forming respective parts of the cage have respective shapes that are identical with each other.

7. The rolling contact bearing assembly as claimed in claim 1, which will become an idler bearing in a transmission.

* * * * *